(No Model.) 3 Sheets—Sheet 1.
G. SWEET.
HARVESTER.
No. 246,430. Patented Aug. 30, 1881.
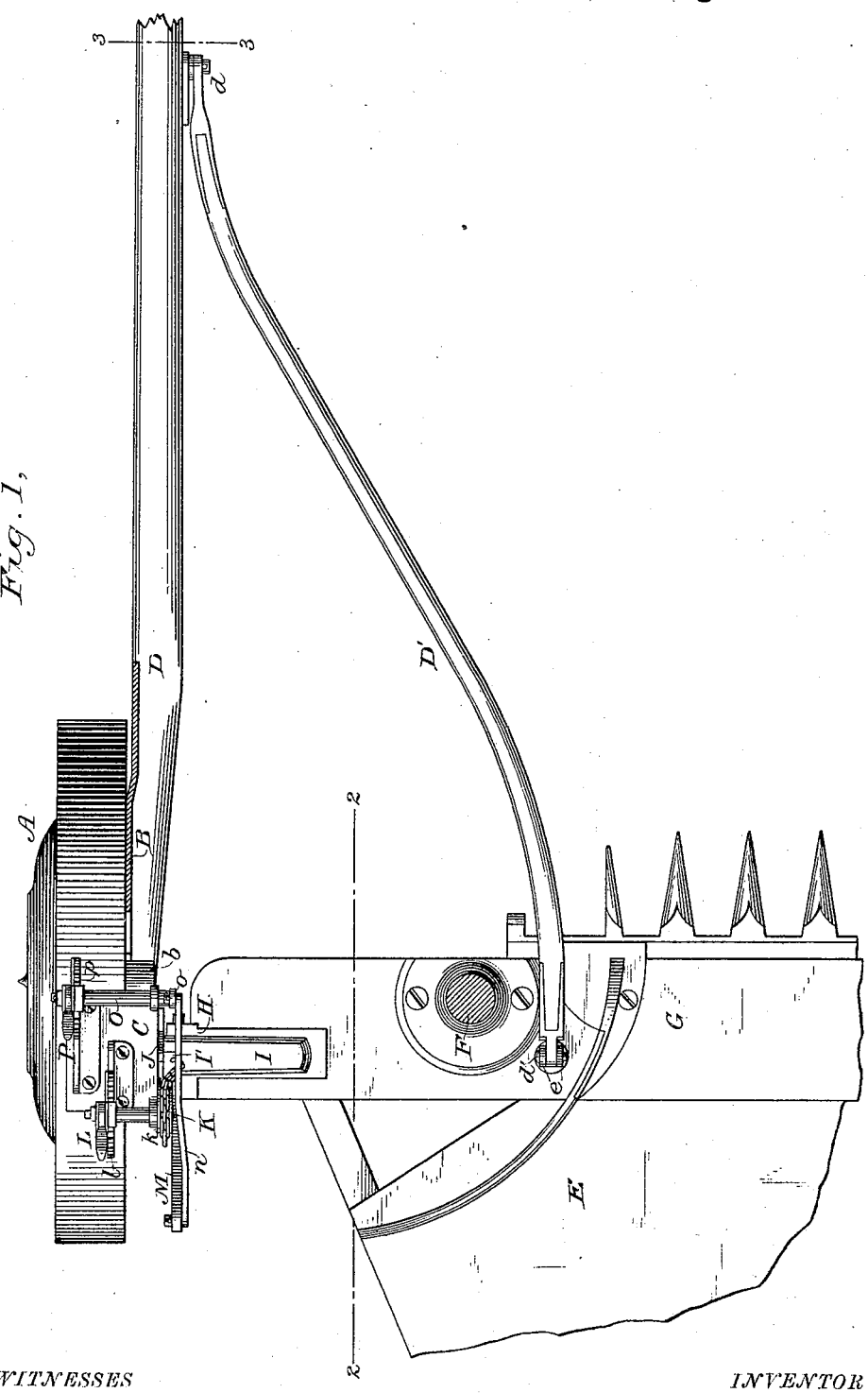
WITNESSES
Wm A. Skinkle,
Geo W. Breck.
By his Attorneys
Baldwin, Hopkins & Payton
INVENTOR
George Sweet.

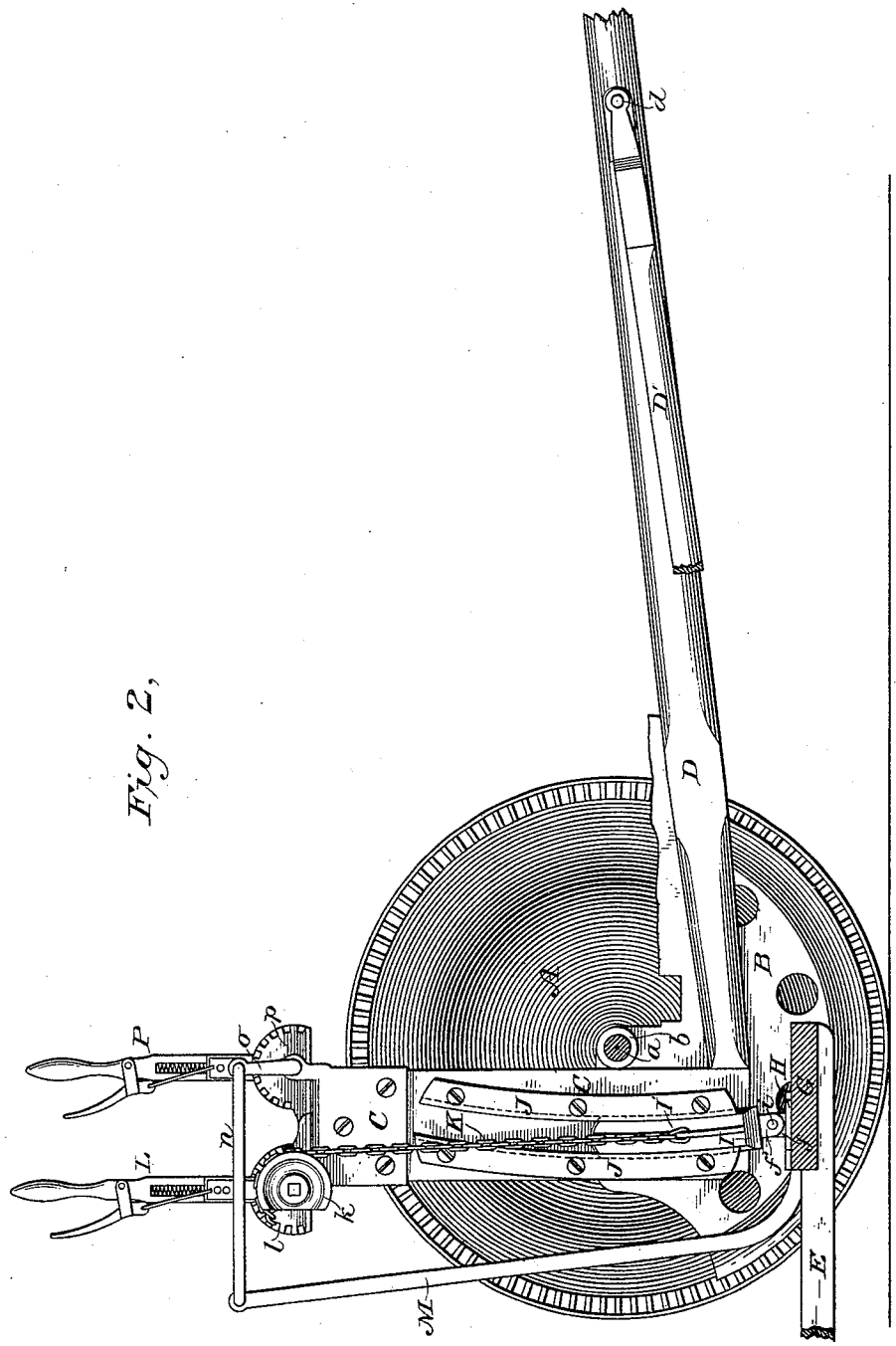

(No Model.)
3 Sheets—Sheet 3.
G. SWEET.
HARVESTER.
No. 246,430. Patented Aug. 30, 1881.
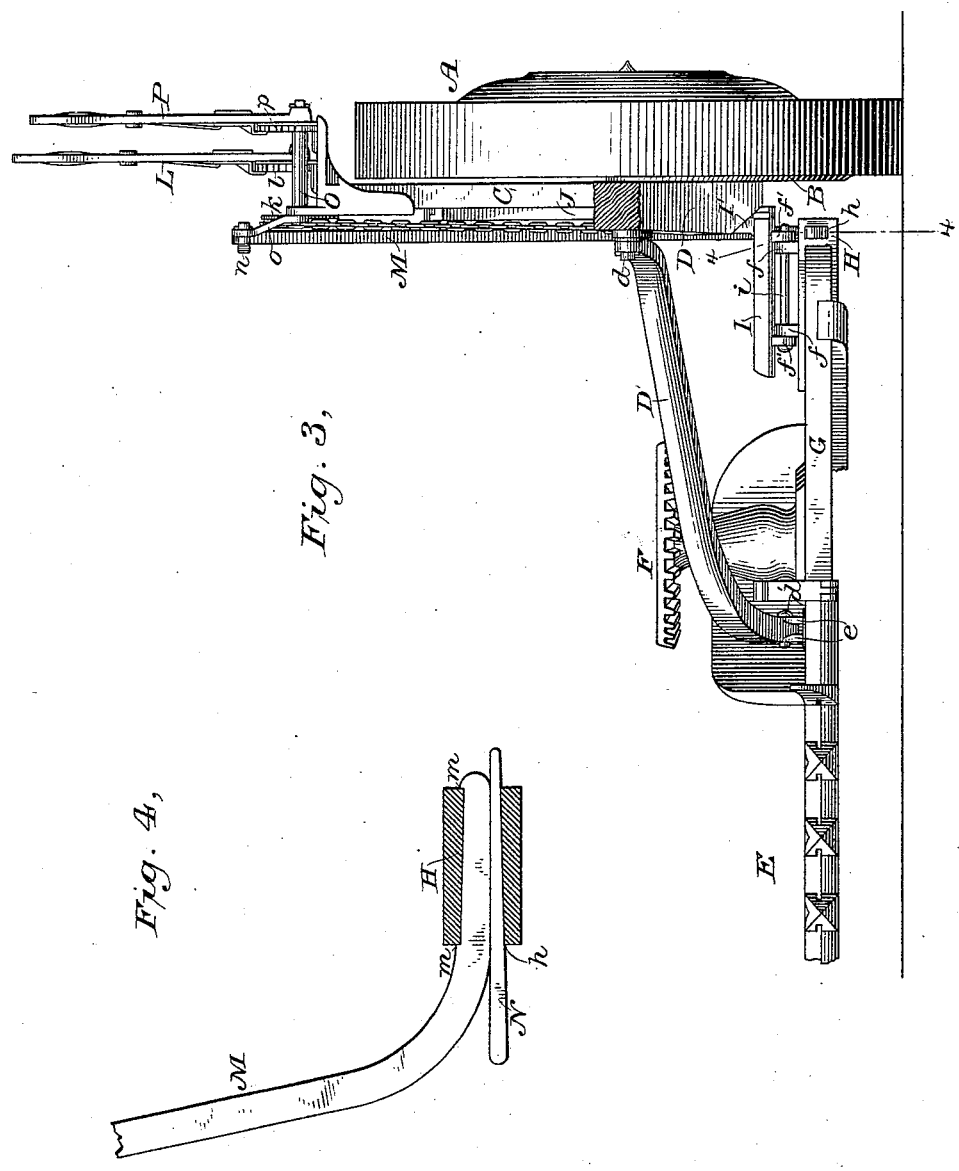
WITNESSES
Wm. A. Skinkle
Geo. W. Freck.
By his Attorneys
INVENTOR
George Sweet,
Baldwin, Hopkins & Peyton.
N. PETERS. Photo-Lithographer, Washington, D. C.

UNITED STATES PATENT OFFICE.

GEORGE SWEET, OF DANSVILLE, NEW YORK.

HARVESTER.

SPECIFICATION forming part of Letters Patent No. 246,430, dated August 30, 1881.

Application filed July 8, 1881. (No model.)

*To all whom it may concern:*

Be it known that I, GEORGE SWEET, of Dansville, in the county of Livingston and State of New York, have invented certain new and useful Improvements in Harvesters, of which the following is a specification.

My invention relates to improvements in grain-harvesting machines of the one-wheel stiff-tongue class, and especially pertains to means whereby the cutting apparatus and platforms may be raised and lowered and be tilted or varyingly inclined by rocking the finger-beams about their pivotal attachments to or jointed connections with the frames and tongues of such machines.

My object mainly is to so connect the cutting apparatus with and support it by the main frame and its rigidly-attached or stiff tongue that the finger-beam, as raised and lowered, will be firmly sustained and supported throughout its adjustments squarely to or at an unchanging angle with the main frame and line of draft; and to secure this parallelism of position throughout the adjustments in accordance with my invention, as will hereinafter fully be described preparatory to a specific designation of the improvements claimed, the finger-beam, at its heel-connection with the main frame and throughout its entire length, is caused, when raised or lowered, to move in a curved path coinciding with an arc concentric with the pivot or center about which its connection with the tongue plays.

Besides the novel organization of parts for vertically adjusting and preserving the parallelism of position of the finger-beam at all heights of the cutting apparatus, my improvements consist in certain combinations of devices for rocking the finger-beam, as hereinafter specifically claimed.

The accompanying drawings represent a suitable application of my improvements to a well-known form of one-wheel rigid-tongue machine, such in general features of construction as that selected by John S. Royce upon which to ingraft certain improvements claimed by him in United States Letters Patent No. 148,327, dated March 10, 1874. Such old features of a fully-organized machine as are neither illustrated by the annexed drawings nor in detail described herein may be of any desired and proper construction.

Figure 1 is a plan or top view with the rake-post in section, the tumbling-shaft for driving the rakes, the pitman for actuating the cutters, the driver's seat, the grain-wheel, and parts of the cutting apparatus, platform, and tongue being omitted; Fig. 2, a view partly in side elevation and partly in section on the line 2 2 of Fig. 1, the main frame being broken away, below where the omitted crank-shank would be located were it shown; Fig. 3, a front elevation, with the tongue in section on the line 3 3 of Fig. 1; and Fig. 4, a view on an enlarged scale, partly in side elevation and partly in section on the line 4 4 of Fig. 3, representing the lower portion of the lever for rocking the finger-beam and the manner of securing it in place.

The single driving-wheel A, the axle $a$, its journal box or bearing $b$, and the main frame, consisting of the frame-plate B and the upright portion or standard C, are all of usual construction, as are also a driver's seat, the rigidly-attached or stiff tongue D, platform E, grain-wheel, rake-post F, and the finger-beam G, guards, &c., of the cutting apparatus. The finger-beam and tongue are connected by a brace or draw bar, D', which at its forward end is jointed to the tongue by a pivot, $d$, and diverges or inclines away from the tongue from front to rear, as usual. The rear end of this brace-bar is jointed to the finger-beam close to its upper surface, the brace being suitably curved or inclined to bring its rear end down to the proper level at which it is shown as jointed to the finger-beam, near the rake-post thereon and some distance from its heel, by means of a pivot-pin, $d'$, passing through the brace-bar and through low lugs or ears $e\ e$ on the finger-beam.

Two rigidly-secured lugs, $f f$, at short distances apart, are provided upon the finger-beam at or near its heel end, and are of a height about corresponding with that of the brace-bar lugs $e\ e$, and in line with them. These finger-beam-heel lugs are in this instance shown as formed upon a clip-iron or forked socket-piece, H, embracing the finger-beam heel, and provided with an eye or socket, $h$, for a rocking lever, to be hereinafter described.

A bracket, I, by which the finger-beam is connected with and supported by the main frame, is hinged to the lugs or ears $f f$ by a pin or bolt, i, directly in line with the jointed connection between the rear end of the draw-bar D' and the finger-beam—that is to say, the pivots d' and i are located in the same vertical and horizontal planes. The coinciding arcs described by these pivots in raising and lowering the finger-beam, as will presently be explained, are of radii defined by the movements of the jointed rear end of the brace-bar as this bar vibrates about its pivotal connection with the tongue.

The hinged bracket I is provided with a guide-arm or slide-piece, I', curved to fit and work in a curved guideway, J, secured to the main frame. This guideway is of a curvature coinciding with the curved path in which the finger-beam moves up and down, the arc of the guideway being concentric with the pivot d, or center about which the brace-bar vibrates on the tongue. The bracket I is shown as of angular form, the horizontal or base portion of this angle-bracket being provided with the downwardly-projecting lugs, f' f', through which, as well as through the finger-beam lugs f f, the bolt i passes, while its upwardly-projecting portion or shank constitutes the curved slide-piece I', working in the guideway and overlapped by the guideway-flanges.

By the above-described construction of parts it will readily be seen that in whatever position the cutting apparatus may be adjusted the finger-beam will be maintained parallel with the position from which it was moved up or down—that is to say, the front edge of the beam, from end to end, when in any one position, will be in a vertical plane parallel to any other vertical plane it may be caused to occupy in its various positions of adjustment, and this without cramping or unduly straining the parts. The finger-beam, &c., are raised and lowered and held as desired by suitable means, as by the chain K, attached to the supporting-bracket, the wheel or segment k, to which the chain is fastened, the lifting-lever L, toothed segment l, and the spring-detent for engagement therewith.

As means of rocking the finger-beam, &c., about the jointed connections between the finger-beam and the supporting-bracket I and brace-bar D', a long upright arm or lever, M, is inserted at its lower curved or horizontally-bent end into the eye h of the socket-iron or clip-piece H at the heel of the finger-beam, and detachably but rigidly secured in place. As shown in Fig. 4, the lever end is recessed on its top surface to form a seat between shoulders m m engaging the opposite edges of the clip-iron when a wedge, N, is forced into the eye h below the lever end. Obviously the lever might be attached in other ways, as by reducing its end which projects through the socket h, threading it, and screwing on a nut, or by inserting a pin through the lever.

The lever M is connected at top by a link, n, with the crank o of a rock-shaft, O, located well forward on the main-frame upright, and controlled by a tilting lever, P, provided with a spring-detent engaging a retaining-segment, p, as well understood.

It will be seen that the parallelism or position of the finger-beam throughout its vertical adjustments is not interfered with by the operation of the rocking lever M, the rocking movements of the finger-beam being about an axis in the radius of an arc described by the pivot d' as the brace-bar moves about its pivotal connection with the tongue.

I do not claim, broadly, the combination, in a one-wheel stiff-tongue machine, of a finger-beam having jointed connection with the frame, a brace-bar having jointed connection both with the tongue and finger-beam, and means for raising and lowering and for rocking the finger-beam; nor do I unqualifiedly claim any of these elements separately or in combination, as such features and combinations of devices, broadly considered, are older than my invention. Neither do I broadly claim a construction of parts whereby a finger-beam may be adjusted up and down in the arc of a circle, nor unqualifiedly the combination of a curved guideway and a finger-beam vertically adjustable therein, such construction and combination, broadly considered, being older than my invention.

I claim as of my own invention—

1. The combination of the single driving-wheel, the main frame, the finger-beam, the bracket hinged to the heel of the finger-beam, supported by the main frame and guided in a curved path as vertically adjusted relatively thereto, the tongue rigidly attached to the main frame, the brace-bar pivoted to the tongue, and the pivot connecting the brace-bar with the finger-beam in the horizontal and vertical planes of the pivot connecting the supporting-bracket with the finger-beam, whereby said bracket in its vertical movements describes an arc concentric with the pivot about which the brace-bar vibrates on the tongue and a parallelism of position of the finger-beam throughout its adjustments is secured, substantially as hereinbefore set forth.

2. The combination of the main frame, its curved guideway, the supporting-bracket jointed to the finger-beam and sliding in said guideway, the stiff tongue, and the brace-bar jointed to the tongue and having jointed connection with the finger-beam in the vertical and horizontal planes of the jointed connection between the finger-beam and its supporting-bracket, these members being and operating substantially as hereinbefore set forth.

3. The combination of the finger-beam, the supporting-bracket by which it is vertically adjusted in a curved path, the brace-bar, and the lugs on the finger-beam in line with each other, with which lugs the supporting-bracket and brace-bar have jointed connection, by means of which the finger-beam may be rocked about its longitudinal axis without interfering with the parallelism of position of the finger-beam throughout its adjustment, substantially as hereinbefore set forth.

4. The combination of the main frame, its curved guideway, the supporting-bracket jointed to the finger-beam and sliding in said guideway, the stiff tongue, the brace-bar jointed to the tongue and having jointed connection with the finger-beam in the vertical and horizontal planes of the jointed connection between the finger-beam and its supporting-bracket, and the rocking lever by which the finger-beam is rocked about its pivotal connections with the supporting-bracket and brace-bar, substantially as and for the purpose hereinbefore set forth.

5. The combination of the main frame, the curved guideway, the finger-beam, the lugged supporting-bracket, and the lugs secured to the finger-beam with which the bracket is pivoted, substantially as and for the purpose hereinbefore set forth.

6. The clip-iron for the heel of the finger-beam, constructed as described, with the pivot lugs and the eye or socket for the rocking lever.

7. The combination of the finger-beam, the clip-iron at the heel thereof, and the angle-bracket pivoted to the clip-iron and supporting the finger-beam in the curved guideway of the main frame, substantially as hereinbefore set forth.

In testimony whereof I have hereunto subscribed my name.

GEORGE SWEET.

Witnesses:
ALBERT SWEET,
F. T. BRETTLE.